(12) United States Patent
Adams et al.

(10) Patent No.: US 8,732,977 B2
(45) Date of Patent: May 27, 2014

(54) METHOD OF PRODUCING STRUCTURAL COMPONENTS HAVING IMPROVED TOUGHNESS

(75) Inventors: Richard Adams, Bristol (GB); Peter Griggs, Bristol (GB); Glenn Watson, Bristol (GB)

(73) Assignee: Airbus Operations Limited, Bristol (GB)

( * ) Notice: Subject to any disclaimer, the term of this patent is extended or adjusted under 35 U.S.C. 154(b) by 1082 days.

(21) Appl. No.: 11/776,929

(22) Filed: Jul. 12, 2007

(65) Prior Publication Data

US 2008/0214780 A1 Sep. 4, 2008

(30) Foreign Application Priority Data

Aug. 14, 2006 (GB) .................................. 0616119.4

(51) Int. Cl.
*C08K 3/04* (2006.01)
*C08G 59/00* (2006.01)

(52) U.S. Cl.
USPC ............ 34/329; 524/495; 524/612; 528/403; 528/499; 528/503; 428/413

(58) Field of Classification Search
USPC .................... 528/425, 403, 499, 503; 34/329; 524/612
See application file for complete search history.

(56) References Cited

U.S. PATENT DOCUMENTS

| | | | | |
|---|---|---|---|---|
| 5,047,453 A | * | 9/1991 | Vost et al. | 523/447 |
| 5,360,840 A | * | 11/1994 | Chan et al. | 523/428 |
| 6,069,192 A | * | 5/2000 | Shalaby et al. | 523/205 |
| 6,117,551 A | * | 9/2000 | Nagata et al. | 428/408 |
| 6,379,799 B1 | * | 4/2002 | Almen | 428/413 |
| 6,393,726 B1 | * | 5/2002 | Momose et al. | 34/329 |
| 6,620,510 B1 | * | 9/2003 | Taguchi et al. | 428/413 |
| 2009/0111924 A1 | * | 4/2009 | Ito et al. | 524/384 |

FOREIGN PATENT DOCUMENTS

| | | |
|---|---|---|
| EP | 0 327 125 A3 | 8/1989 |
| EP | 0 885 704 A1 | 12/1998 |
| EP | 1 454 936 A1 | 9/2004 |
| JP | 61-296021 A | 12/1986 |
| JP | 2-14213 A | 1/1990 |
| JP | 2004-43653 A | 2/2004 |
| WO | WO02/02666 A1 | 1/2002 |

OTHER PUBLICATIONS

"US Desing Outdoor Temperature and Relative Humidity—Winter and Summer", The Engineering Tool Box, http://www.engineeringtoolbox.com/us-outdoor-design-temperature-humidity-d_296.html, 2005, 4 pages.*
Parida et al., "Structural Integrity Assessment of Composite Pressure Test Box through Full Scale Test", Composite Materials: Testing, Design, and Acceptance Criteria, ASTM STP 1416, 2002, pp. 69-89.*
GB Search Report dated Dec. 12, 2006 for GB0616119.4.

* cited by examiner

*Primary Examiner* — Nicole M Buie-Hatcher
(74) *Attorney, Agent, or Firm* — Lowe Hauptman & Ham, LLP

(57) ABSTRACT

A method of producing a structural component comprising manufacturing a structural component from a moisture absorbable material the toughness of which increases with increasing moisture absorption and subsequently subjecting the structural component to at least one of elevated temperature and humidity for a period of time such that the structural component attains a predetermined moisture content and distribution.

20 Claims, 1 Drawing Sheet

METHOD OF PRODUCING STRUCTURAL COMPONENTS HAVING IMPROVED TOUGHNESS

RELATED APPLICATIONS

Figure 1:
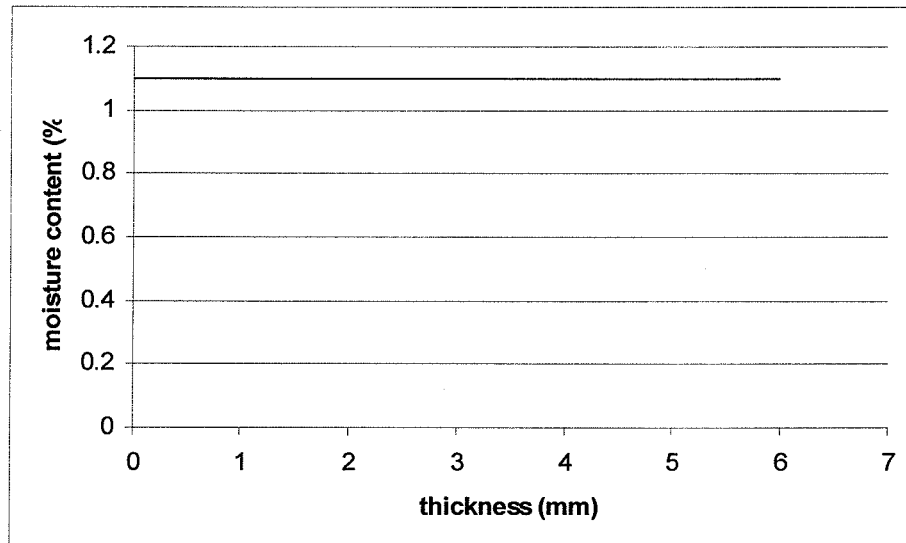

The present application is based on, and claims priority from, British Application Number 0616119.4, filed Aug. 14, 2006, the disclosure of which is hereby incorporated by reference herein in its entirety.

The present application relates to a method of producing structural components having improved toughness and in particular, but not exclusively, components to be used in the manufacture of aircraft.

Non-metallic structures have many advantages over their metallic counterparts, most notably providing significant weight savings without a corresponding loss of strength, for example through the accurate alignment of non-metallic fibres to the direction of the expected applied load, the fibres being arranged in a number of overlapping layers, or plies. However, one consideration that must be taken into account in the design process, and which cannot be solved simply by a specified orientation of the fibre plies, is damage tolerance. This refers to the tolerance of the component to damage caused by an unexpected, random, impact to the structure. Current design philosophies and working practices entail carrying out testing to determine the mechanical properties of a component after impact and the subsequent test data used, in conjunction with probability techniques to determine the likelihood of such damage, to arrive at an agreed design specification that is approved by the appropriate certification authorities.

The vulnerability of a material to impact damage is related to its toughness. The tougher a material the greater the impact energy it can absorb and hence the less damage that will occur. For example, composite systems, such as epoxy matrix systems, whilst being of high strength are relatively brittle compared to their metallic counterparts. This high stiffness and brittle characteristic means that such composite components tend to have a low toughness and are therefore more susceptible to impact damage than their metallic counterparts. In the area of aircraft manufacture, the most common causes of impact damage occur during assembly operations in which technicians and mechanics may have to assemble the composite components in circumstances of restricted space and access, which increases the likelihood of a technician or mechanic accidentally striking a composite structure with, say, a booted foot or may increase the likelihood of a metallic tool, such as screwdriver or hammer, being dropped onto a composite component. Additionally, impact damage to the aircraft may arise through an object striking the aircraft during take off, landing or during flight.

Such impact damage in non-metallic structures is often difficult to see visually and can also be relatively easily missed by other forms of detection such as, for example, ultrasonic inspection. Consequently, the structural component has to be able to withstand such probable impacts whilst still being able to continue operating safely within the design parameters. Certain groups of materials, such as certain plastics and epoxy resin composite systems, readily absorb moisture by diffusion. Whilst this is a relatively slow process measured in terms of millimetres over time periods measured in weeks, months and years, the presence of moisture within a material degrades the material properties. It is therefore necessary to take into account this reduction in strength during the design process and specify the design and dimensions of the component on the worst case basis that a maximum amount of moisture has been absorbed by the structure (saturation). The components are therefore effectively over-engineered relative to the theoretical requirements. In contrast, accepted practice is to design the composite component on the basis of the worst case damage tolerance, which assumes that the composite material is completely dry and has absorbed no moisture, and is thus at its most brittle. Thus the two design requirements are in conflict.

According to a first aspect of the present invention there is provided a method of producing a structural component comprising manufacturing a structural component from a moisture absorbable material the toughness of which increases with increasing moisture absorption and subsequently subjecting the structural component to at least one of elevated temperature and humidity for a period of time such that the structural component obtains a predetermined moisture content and distribution.

The moisture content and distribution is preferably determined according to a desired increase in toughness of the material. Preferably, the desired increase in toughness may be determined by stress calculations. Alternatively, the desired increase in toughness may be determined by experimentation.

Additionally or alternatively, the predetermined moisture distribution may comprise an inner portion of the structural component that is moisture free and an outer portion extending from the inner portion to a surface of the structural component, the outer portion having a moisture content that increases from a minimum adjacent to the inner portion to a maximum at the component surface.

Additionally or alternatively, the duration of the time period over which the structural component may be subjected to at least one of the elevated temperature and humidity may be previously determined by a numerical modelling of the moisture diffusion of the material.

Alternatively, the duration of the time period over which the structural component is subjected to at least one of the elevated temperature and humidity may be determined by periodically weighing the structural component to determine the moisture content, the time period ending when the predetermined moisture content is reached.

Preferably, the moisture absorbable material comprises a composite material, more preferably an epoxy resin matrix carbon fibre.

Preferably, the structural component may comprise an aircraft component.

Figure 2:
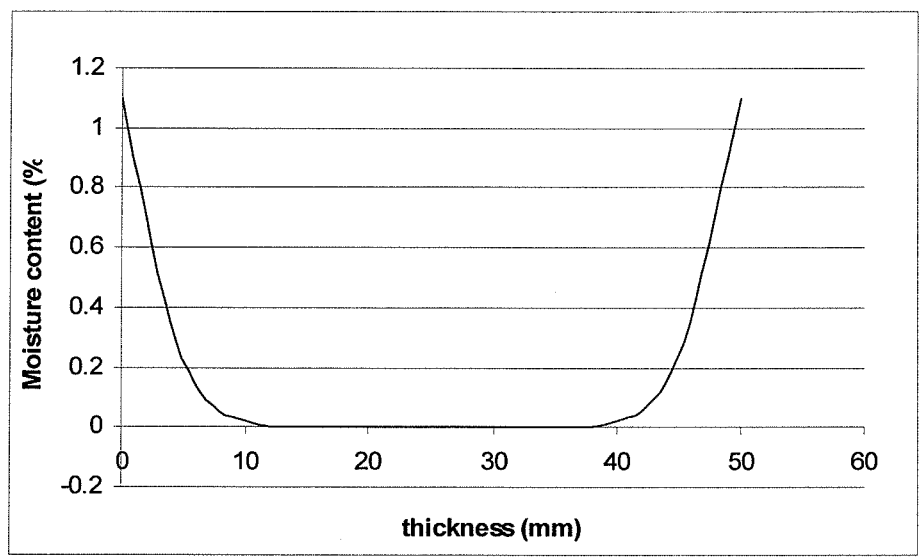

Embodiments of the present invention will now be described below, with reference to the accompanying figures of which:

FIG. 1 schematically illustrates the moisture distribution in a composite structure of approximately 6 mm in thickness; and FIG. 2 schematically illustrates the moisture distribution within a composite component of approximately 50 mm thickness subsequent to conditioning in accordance with the present invention.

Whilst the following embodiment deals with a structure manufactured from a composite material, it will be understood that this is only a single example and that the invention is applicable to all materials, such as non-composite plastics, that exhibit moisture absorption.

FIG. 1 graphically represents the moisture distribution at a given point in time for a composite component of 6 mm thickness. As can be seen, the composite component has a uniform moisture distribution throughout the full thickness of the component, this being the situation when the composite component is in a fully saturated state. By saturation it is meant that the composite component has absorbed the maximum possible amount of moisture for a given set of conditions. For the example represented in FIG. 1 the saturation point is represented by a moisture content of approximately 1.1% of the dry mass of the component. Although it may take a number of months for a composite component of this thickness to reach saturation, the component will have been completely dry at the time of manufacture and the toughness of the composite will therefore have been considered to be the value for the completely dry composite material. As noted above, composite materials tend to be more brittle, and thus less tough, than their metallic counterparts.

In addition, since it is highly probable that within the surface life of the composite component it will reach saturation, the component must be designed from the outset on the basis that its strength is only that exhibited by saturated component which is less than the theoretical strength of the component when completely unsaturated.

However, for larger structures, for example a commercial aircraft, it is not unknown for the composite components to have thicknesses in the order of 50 mm. Composite structures of this order of magnitude are extremely unlikely to become saturated throughout their full thickness over the course of their service lifetime. Based on this realisation, in embodiments of the present invention composite components are subject to a conditioning process, which involves subjecting the newly manufactured component to conditions of elevated temperature and humidity for a given period of time, that serve to knowingly introduce a known and predetermined level of moisture in the outer plies of the composite component. Since the outer plies have a known level of moisture content the toughness of the outer plies is increased relative to a completely dry component and the conditioned composite component thus exhibits improved impact damage tolerance. Furthermore, since it is extremely unlikely that the complete thickness of such thick structures will become saturated, the structure can be designed on the basis of the inner 'core' remaining dry and thus having a greater strength. Since the amount of saturation and its depth over the outer plies can be controlled through the conditioning process the improved damage tolerance is predictable and repeatable and can thus satisfy the criteria set by certification authorities in safety critical applications.

FIG. 2 schematically illustrates the moisture distribution for a composite structure that has been conditioned according to embodiments of the present invention. In the example illustrated in FIG. 2, the composite structure as an overall thickness of 50 mm yet only the outer 10-11 mm of the structure have any moisture content, the moisture content increasing towards the outer plies of the composite structure. The inner "core" of the structure is completely dry. Since the moisture content of the outer plies increases towards the outer surface, the toughness of the outer plies also increases. The example illustrated in FIG. 2 represents the condition of the composite structure subsequent to having been conditioned at a constant temperature of 70° C. and relative humidity of 85% for a period of one year. Whilst in the illustrated example approximately 10 mm of outer material has some level of moisture within it, this may be less (or more) depending on the desired end properties of the composite structure. For example, it may be satisfactory to condition a composite structure such that only 2-4 mm of the outer plies have any moisture content. The approximate time to achieve this level of saturation in the outer plies at the above given temperature and humidity conditions would be approximately 6-8 weeks. The conditioning can be performed in a conditioning chamber of known design.

In preferred embodiments of the present invention the method of producing the composite component having improved damage tolerance is as follows:—

Determine the required number/thickness of saturated plies to increase the damage tolerance of the component to the desired level.

After manufacture of the composite component, place the finished component in a conditioning chamber.

Condition the component at high temperature and high humidity levels, to ensure reduce conditioning time.

On completion of conditioning, remove the composite component from the conditioning chamber and make available for assembly.

The number of thickness of saturated plies required to increase damaged tolerance of the composite material to the desired level is preferably determined using known stress calculation techniques. Alternatively, the required number or thickness of saturated plies may be determined by experimental means.

One method of determining if the component has reached the desired level of moisture level of absorption is to periodically weigh the component and thus directly monitor the moisture content as a percentage of the dry mass of the composite component. This can be achieved within the conditioning chamber with suitable weighing equipment, which will be known to those skilled in the art.

Alternatively, and in preferred embodiments of the present invention, the time taken to condition the component to reach the required level of saturated plies is predicted using a diffusion model the model being based on Fickian Diffusion. An example of how such a model can be derived is as follows.

Moisture diffusion is described by Fick's second law which in three dimensions is as follows:

$$\frac{\partial C}{\partial t} = D_x\left(\frac{\partial^2 C}{\partial x^2}\right) + D_y\left(\frac{\partial^2 C}{\partial y^2}\right) + D_z\left(\frac{\partial^2 C}{\partial z^2}\right) \quad (1)$$

where C represents the local mass water concentration inside the composite (g/mm$^3$), t the time (s), x, y & z the distance (mm) and $D_x$, $D_y$ & $D_z$ the coefficients of diffusion in every direction (mm$^2$/s). For a homogeneous model, equation (1) can be simplified to:

$$\frac{\partial C}{\partial t} = D\left(\frac{\partial^2 C}{\partial x^2} + \frac{\partial^2 C}{\partial y^2} + \frac{\partial^2 C}{\partial z^2}\right) \quad (2)$$

as it is assumed that diffusion occurs equally in all directions ($D_x=D_y=D_z=D$).

It is assumed that the diffusion coefficient is only dependent on temperature and can be modelled with the Arrhenius law:

$$D = D_0 \exp\left(-\frac{Q}{RT}\right) \quad (3)$$

where R is the universal gas constant (8.3144 J/mol·K), Q the activation energy for diffusion (J/mol), T the temperature (K) and $D_0$ the theoretical maximum diffusion coefficient.

In addition to the coefficient of diffusion D, which characterises the rate of water absorption, a second parameter of practical interest is the equilibrium moisture content, $M_m$.

This represents the maximum amount of absorbed moisture that a material can contain at moisture equilibrium for given moisture exposure level, expressed as a percent of dry material mass:

$$M_m = \frac{W_{sat} - W_{dry}}{W_{dry}} \times 100 \quad (4)$$

where $W_{sat}$ is the mass at saturation (g) and $W_{dry}$ the dry specimen mass (g).

$M_m$ is not explicitly part of Fick's law but is used to determine boundary conditions. It is considered that locally, at the faces of the object, the concentration is equal to the equilibrium moisture content. Thus it is assumed, at t=0, the faces of the object are instantaneously saturated with moisture.

In addition, the relative humidity influences the equilibrium moisture content. Its effect is modelled by the following empirical relationship:

$$M_m = a(\mathrm{RH})^b \quad (5)$$

where a and b are empirical constants and RH is the relative humidity (%).

A solution to equation 2 is obtained from the following simplifying assumptions:
1. The ambient temperature and ambient moisture content are the same on each face.
2. The concentration at each face is equal to the equilibrium moisture content of the material at the given relative humidity.
3. The temperature inside the material approaches equilibrium much faster than the moisture concentration and as such the temperature inside the material can be taken to be the same as the ambient temperature.
4. Initially, the moisture distribution is uniform inside the material.
5. The mass diffusivity is only dependent on temperature and is independent of moisture concentration and stress level inside the material
6. The plate is made of a single layer and is homogeneous so that variations of D with position inside the material may be neglected.

For the above assumptions the temperature inside the material is uniform:

$$T = T_i = T_a \quad 0 \leq x \leq X \quad t \geq 0$$

The concentration is described by equation 2 with the initial conditions and boundary conditions:

$$C = C_i \text{ for } \begin{Bmatrix} 0 \leq x \leq X \\ 0 \leq y \leq Y \\ 0 \leq z \leq Z \end{Bmatrix} \text{ at } t = 0$$

$$C = C_a = M_m \text{ for } \begin{Bmatrix} x < 0; x > X \\ y < 0; y > Y \\ z < 0; z > Z \end{Bmatrix} \text{ at } t \geq 0$$

Equation 2 can be approximated using a second derivative in space and a first derivative in time such that:

$$\frac{\partial^2 C}{\partial x^2} \cong \frac{C_{i+1,j,k}^n - 2C_{i,j,k}^n + C_{i-1,j,k}^n}{\Delta x^2} \quad (6a)$$

-continued $$\frac{\partial^2 C}{\partial y^2} \cong \frac{C_{i,j+1,k}^n - 2C_{i,j,k}^n + C_{i,j-1,k}^n}{\Delta y^2} \quad (6b)$$

$$\frac{\partial^2 C}{\partial z^2} \cong \frac{C_{i,j,k+1}^n - 2C_{i,j,k}^n + C_{i,j,k-1}^n}{\Delta z^2} \quad (6c)$$

and $$\frac{\partial C}{\partial t} \cong \frac{C_{i,j,k}^{n+1} - C_{i,j,k}^n}{\Delta t} \quad (7)$$

$$\frac{C_{i,j,k}^{n+1} - C_{i,j,k}^n}{\Delta t} = D\left[\left(\frac{C_{i+1,j,k}^n - 2C_{i,j,k}^n + C_{i-1,j,k}^n}{\Delta x^2}\right) + \left(\frac{C_{i,j+1,k}^n - 2C_{i,j,k}^n + C_{i,j-1,k}^n}{\Delta y^2}\right) + \left(\frac{C_{i,j,k+1}^n - 2C_{i,k,k}^n + C_{i,j,k-1}^n}{\Delta z^2}\right)\right] \quad (8)$$

which can be rearranged to give an explicit finite difference model $$C_{i,j,k}^{n+1} = C_{i,j,k}^n + \frac{D\Delta t}{\Delta x^2}[C_{i+1,j,k}^n - 2C_{i,j,k}^n + C_{i-1,j,k}^n] + \frac{D\Delta t}{\Delta y^2}[C_{i,j+1,k}^n - 2C_{i,j,k}^n + C_{i,j-1,k}^n] + \frac{D\Delta t}{\Delta z^2}[C_{i,k,k+1}^n - 2C_{i,j,k}^n + C_{i,j,k-1}^n] \quad (9)$$

with the standard stability restriction $$\delta t \leq \min\left(\frac{1}{6}\frac{\delta x^2}{D_x}, \frac{1}{6}\frac{\delta y^2}{D_y}, \frac{1}{6}\frac{\delta z^2}{D_z}\right) \quad (10)$$

Equation (9) can be used to calculate the moisture absorption at varying times and depths within the material and thus determine the time period required to condition a component to the required state.

In these equations n indicates the present value and n+1 represents the future value after $\Delta t$ seconds. Substituting equations 6 and 7 into equation 1 yields.

Although the above exemplary embodiments of the present invention have been described with reference to epoxy resin matrix structures, the method is valid for any material that exhibits moisture absorption together with a corresponding increase in toughness. Additionally, to take into account drying effects of a condition component during the time period between conditioning and subsequent assembly, the component may be saturated to a greater extent and this theoretically required. It will also be appreciated by those skilled in the art that the method of the present invention is fully applicable to composite components intended for applications other than the aerospace industry, such as automotive applications and structural building applications.

The invention claimed is:

1. A method of producing a structural component from a moisture absorbing material, comprising:
   determining a moisture content and a distribution of the moisture absorbing material according to a desired increase in toughness of the moisture absorbing material;
   manufacturing the structural component from two or more plies of the moisture absorbable material, the toughness of which increases with increasing moisture absorption; and subsequently
   conditioning, in a conditioning chamber, the structural component to at least one of elevated temperature and humidity for a period of time sufficient to introduce a known and predetermined level of moisture to one or more outer plies of the structural component whereby the structural component attains the predetermined moisture content and distribution, wherein the predetermined moisture distribution comprises an inner portion of the structural component that is moisture free and an outer portion extending from the inner portion to a surface of the structural component, the outer portion having a moisture content that increases from a minimum adjacent to the inner portion to a maximum at the surface of the structural component; and when the predetermined moisture content and distribution is attained the structural component is removed from the conditioning chamber.

2. The method of claim 1, wherein the desired increase in toughness is determined by stress calculations.

3. The method of claim 1, wherein the desired increase in toughness is determined by experimentation.

4. The method of claim 1, wherein the duration of the period of time over which the structural component is conditioned to at least one of the elevated temperature and humidity is previously determined by numerical modeling of the moisture diffusion of the material.

5. The method of claim 1, wherein the period of time over which the structural component is conditioned to at least one of the elevated temperature and humidity is previously determined by numerical modeling of the moisture diffusion of the material and is determined by periodically weighing the structural component to determine the moisture content, the time period ending when the predetermined moisture content is reached.

6. The method of claim 1, wherein the moisture absorbable material comprises a composite material.

7. The method of claim 1, wherein the structural component comprises an aircraft component.

8. The method of claim 1, wherein the predetermined moisture content and distribution is limited to 2-4 mm of the outer material of the structural component.

9. The method of claim 1, wherein the predetermined moisture content and distribution is limited to 10-11 mm of the outer material of the structural component.

10. The method of claim 1, wherein the structural component is conditioned at 70 degrees C. and 85% relative humidity.

11. The method of claim 1, wherein the structural component is conditioned at the elevated temperature and humidity for at least six weeks.

12. The method of claim 1, wherein the structural component is a finished structural component.

13. A method of producing a structural component from a moisture absorbing material comprising a composite material which comprises epoxy resin matrix carbon fibre, comprising:

determining a moisture content and a distribution of the moisture absorbing material according to a desired increase in toughness of the moisture absorbing material;

manufacturing the structural component from two or more plies of the moisture absorbable material, the toughness of which increases with increasing moisture absorption; and subsequently conditioning, in a conditioning chamber, the structural component to at least one of elevated temperature and humidity for a period of time sufficient to introduce a known and predetermined level of moisture to one or more outer plies of the structural component whereby the structural component attains the predetermined moisture content and distribution, wherein the predetermined moisture distribution comprises an inner portion of the structural component that is moisture free and an outer portion extending from the inner portion to a surface of the structural component, the outer portion having a moisture content that increases from a minimum adjacent to the inner portion to a maximum at the surface of the structural component; and when the predetermined moisture content and distribution is attained the structural component is removed from the conditioning chamber.

14. The method of claim 13, wherein the structural component is conditioned at 70 degrees C. and 85% relative humidity.

15. The method of claim 13, wherein the outer portion is limited to 2-4 mm.

16. The method of claim 13, wherein the finished structural component is conditioned at elevated temperature and humidity for at least six weeks.

17. The method of claim 13, wherein the structural component is a finished structural component.

18. The method of claim 13, wherein the structural component comprises an aircraft component.

19. A method of producing a structural component from a moisture absorbing material, comprising:

determining a moisture content and a distribution of the moisture absorbing material according to a desired increase in toughness of the moisture absorbing material;

manufacturing a non-composite plastic structural component from two or more plies of the moisture absorbable material, the toughness of which increases with increasing moisture absorption, and subsequently conditioning, in a conditioning chamber, the non-composite plastic structural component to at least one of elevated temperature and humidity for a period of time sufficient to introduce a known and predetermined level of moisture to one or more outer plies of the structural component whereby the structural component attains the predetermined moisture content and distribution, wherein the predetermined moisture distribution comprises an inner portion of the structural component that is moisture free and an outer portion extending from the inner portion to a surface of the structural component, the outer portion having a moisture content that increases from a minimum adjacent to the inner portion to a maximum at the surface of the structural component; and when the predetermined moisture content and distribution is attained the structural component is removed from the conditioning chamber.

20. The method of claim 19, wherein the structural component is conditioned at 70 degrees C. and 85% relative humidity.

* * * * *